3,301,899
PURIFICATION OF TETRACYCLINE
Murray A. Kaplan, Syracuse, and Alphonse P. Granatek, Baldwinsville, N.Y., assignors to Bristol-Myers Company, New York, N.Y., a corporation of Delaware
No Drawing. Filed Nov. 27, 1963, Ser. No. 326,358
19 Claims. (Cl. 260—559)

This invention relates to a novel process for the production of tetracycline. In one aspect, this invention relates to a process for the purification of tetracycline. In another aspect, this invention relates to a process for the preparation of color and potency stable tetracycline compounds. In still another aspect, this invention relates to novel color and potency stable tetracycline compounds and intermediates useful in the preparation thereof.

Tetracycline is a well-known compound and an extremely valuable antibiotic. It is particularly useful as an antibiotic because of its broad spectrum of activity against pathogenic microorganisms. While other tetracyclines are known in the art, e.g., chlortetracycline and oxytetracycline, tetracycline has been found to be more useful in the chemotherapy of bacterial diseases because it gives better blood levels and fewer contraindications than chlortetracycline and oxytetracycline and in addition is more stable than chlortetracycline in alkaline media.

Tetracycline is usually prepared by the catalytic dechlorination of chlortetracycline as described in U.S. Patent 2,699,054, or obtained directly by fermentation of *Streptomyces aureofaciens* or *Streptomyces viridifaciens* according to U.S. Patents 2,712,517, 2,734,018 and 2,739,924. The dechlorination of chlortetracycline results in a mixture of tetracycline and chlortetracycline while chlortetracycline, anhydrotetracycline and quatrimycin (4-epitetracycline) may be coproduced with tetracycline in the fermentation process. The chemical and physical properties of these impurities are so similar that they are extremely difficult to remove by methods suitable for commercial use. However, it is essential that these impurities be substantially removed before tetracycline can be marketed for therapeutic use.

Heretofore, the impurities inherent in the formation of tetracycline have been reduced to a satisfactory level for therapeutic use. However, frequently tetracycline powders, suspensions and solutions have poor color stability, which is believed to be partly caused by certain impurities remaining in the tetracycline after purification. Some tetracycline products tend to darken considerably within a short period of time; thus making them aesthetically objectionable.

Therefore, an object of the present invention is to provide an improved method for the purification of tetracycline.

Another object of the present invention is to provide a process for producing a color and potency stable tetracycline composition.

A further object of the present invention is to provide a novel color and potency stable tetracycline compound.

A still further object of the present invention is to provide novel tetracycline complexes and a process for the preparation thereof.

These and other objects which may appear as the specification proceeds are achieved by the process of this invention which comprises contacting tetracycline with formamide, methylformamide, ethylformamide or dimethylformamide; separating the tetracycline-amide complex that forms and precipitates; slurrying the tetracycline-amide complex with water; and recovering the tetracycline hexahydrate that forms.

It was discovered that tetracycline forms complexes with formamide, methylformamide, ethylformamide and dimethylformamide. These complexes contain a highly purified form of tetracycline. Such impurities as chlortetracycline, 4-epianhydrotetracycline, anhydrotetracycline and quatrimycin (4-epitetracycline) are conveniently separated from tetracycline by the formation of the tetracycline-amide complexes which are readily convertible to tetracycline. Thus, tetracycline may be purified in this manner.

The complexes tetracycline-formamide, tetracycline-methylformamide, tetracycline-ethylformamide and tetracycline-dimethylformamide are novel and useful intermediates for the purification of tetracycline. They may be immediately converted to tetracycline hexahydrate, or stored for prolonged periods of time before being converted to tetracycline hexahydrate. The complexes, in addition, exhibit antibacterial activity making them useful for separating microorganisms and removing microorganisms from laboratory glassware.

The purified tetracycline hexahydrate of this invention is light in color and exhibits remarkable color and potency stability to heat and light when stored for a prolonged period of time. Thus, the compound is more potent, and possesses excellent aesthetic properties.

In carrying out the method of this invention, tetracycline is contacted with formamide, methylformamide, ethylformamide or dimethylformamide. This step is conviently accomplished by adding tetracycline to the amide with mixing. After a short period of time, the tetracycline-amide complex forms and precipitates as a crystalline entity. In practice, tetracycline is added to the liquid amide in the proportion of about 200 to 500 milligrams tetracycline per milliliter of amide, and preferably 300 to 350 milligrams tetracycline per milliliter of amide. The temperature is maintained at about 5° to 40° C. and preferably at about 20° to 30° C., however, usually the process is carried out at room temperature. Often the addition of about 1 milliliter of water to 20 milliliters of the amide before adding tetracycline will increase the yield of tetracycline-amide complex.

The tetracycline is usually added as a hydrate of the free base. Crude tetracycline and purified tetracycline are both useful in the process. Of course, the process is particularly useful for purifying crude tetracycline.

The precipitated tetracycline-amide complex is recovered by any of the conventional liquid-solid separation methods, e.g., filtration. The complex is found to contain tetracycline substantially free of chlortetracycline, 4-epianhydrotetracycline, anhydrotetracycline and quatrimycin 4-epitetracycline). The complex may be dried and stored if desired, or immediately converted to tetracycline.

To recover tetracycline from the amide complex, the wet or dried complex is slurried in water, forming tetracycline hexahydrate crystals. Preferably, about 5 to 20 milliliters of water per gram of tetracycline-amide complex are used and the temperature maintained at less than 40° C. If desired, the tetracycline base hexahydrate may be converted to the trihydrate. This is accomplished by heating to 50° C. in vacuo for 24 hours.

The tetracycline hexahydrate is recovered by filtration or any other suitable means for separating crystals from mother liquor and air-dried, preferably at about 37° C. or less. Tetracycline hexahydrate produced by this process is very color and potency stable to heat and light, and may be stored for long periods of time in the dry state or in the form of chemotherapeutic suspensions. It has been found to be more color stable to heat and light in the dry state than tetracycline trihydrate. In addition, the microcrystalline tetracycline hexahydrate obtained from the tetracycline-dimethylformamide complex is near white in color, and remains near white in water suspensions.

The following examples are given to illustrate the present invention, but are not intended to be construed as limiting.

EXAMPLE 1

*Preparation of tetracycline-formamide complex*

A 20-gram portion of tetracycline base trihydrate was dissolved in formamide (100 ml.). Rapid crystallization occurred. The mixture was stirred for 2 hours at ambient temperature. The very light yellow-colored crystals were removed by filtration, washed with formamide (25 ml.) and isopropanol (50 ml.), and air-dried 24 hours at 37° C. The product, tetracycline-formamide complex, was found to weigh 18 gm. The formation of the tetracycline-formamide complex was confirmed by infrared analysis and gas chromatography, and the complex was found to have the following properties:

| | |
|---|---|
| Bio-assay, mcg./mg. | 940 |
| Percent water (Karl Fischer) | 2.0 |
| Percent nitrogen | 11.52 |
| Melting point (capillary, uncorrected) | 132°–133° C. |
| Klett color [1] | 4 |
| $[\alpha]_D^{25}$ (0.1N HCl) | −250° |
| E 1% (0.1N HCl) | 215$\gamma$=240 |
| | 267$\gamma$=313 |
| | 355$\gamma$=243 |

[1] Ten mg./ml. of tetracycline-formamide complex in formamide, reading on a Klett-Summerson photoelectric colorimeter equipped with a #54 green filter.

EXAMPLE 2

*Preparation of tetracycline-dimethylformamide complex*

A 300-gram portion of tetracycline base trihydrate was slowly added to a solution of water (75 ml.) and dimethylformamide (1500 ml.), and mixed for 3 hours. The microcrystals, almost white in color, were removed by filtration, washed with isopropanol (300 ml.), and dried 16 hours in vacuo at 50° C. The product, tetracycline-dimethylformamide complex, was found to weigh 254 gm. The formation of the tetracycline-dimethylformamide complex was confirmed by infrared analysis and gas chromatography, and the complex was found to have the following properties:

| | |
|---|---|
| Bio-assay, mcg./mg. | 930 |
| Chemical assay, mcg./mg. | 945 |
| Percent water (Karl Fischer) | 0 |
| Percent nitrogen | 8.16 |
| Melting point (capillary, uncorrected) | 151° C. |
| Klett color [1] | 6 |
| $[\alpha]_D^{25}$ (0.1N HCl) | −226° |
| E 1% (0.1N HCl) | 270$\gamma$=356 |
| | 355$\gamma$=266 |

[1] Ten mg./ml. of tetracycline-dimethylformamide complex in formamide, reading on a Klett-Summerson photoelectric colorimeter equipped with a #54 green filter.

Example 3

*Preparation of tetracycline-N-methylformamide complex*

Sixty grams of tetracycline base trihydrate were dissolved in N-methylformamide (200 ml.). Crystallization was rapid. The mixture was held at ambient temperature for 2 hours. The crystals were removed by filtration, washed with N-methylformamide (25 ml.) and isopropanol (100 ml.), and dried at 50° C. in vacuo for 24 hours. Forty-eight grams of tetracycline-N-methylformamide complex were recovered and found to contain the amide structure as shown by infrared analysis, to have the following elemental analysis: C, 58%; H, 5.85%; N, 13.78%; and to have the following properties:

| | |
|---|---|
| Bio-assay, mcg./mg. | 830 |
| Percent water (Karl Fischer) | 1.1 |
| Melting point (capillary, uncorrected) | 107°–110° C. |
| $[\alpha]_D^{25}$ (0.1N HCl) | −194° |

EXAMPLE 4

*Preparation of tetracycline hexahydrate*

Tetracycline-N-methylformamide complex (35 gm.) prepared in Example 3 was added to water (350 ml.). The mixture was slurried for 1 hour. The crystals were separated by filtration, washed with water (100 ml.), and air-dried at 37° C. for 24 hours. Tetracycline hexahydrate weighing 35 gm. was recovered, and found to contain 19.9% water (Karl Fischer) and bio-assay 1030 mcg./mg. tetracycline.

EXAMPLE 5

*Preparation of tetracycline-N-ethylformamide complex*

Tetracycline base trihydrate (65 gm.) was dissolved in N-ethylformamide (200 ml.). Crystallization was rapid. The mixture was held at ambient temperature for 2 hours. The crystals were removed by filtration, washed with N-ethylformamide (25 ml.) and isopropanol (100 ml.), and dried at 50° C. in vacuo for 24 hours. Fifty-one grams of tetracycline-N-ethylformamide complex were recovered, and found to contain the amide structure as shown by infrared analysis, to have the following elemental analysis: C, 58.4%; H, 6.08%; N, 8.25%; and to have the following properties:

| | |
|---|---|
| Bio-assay, mcg./mg. | 1000 |
| Percent water (Karl Fischer) | 5 |
| Melting point (capillary, uncorrected) | 133°–136° C. |
| $[\alpha]_D^{25}$ (0.1N HCl) | −230° |

EXAMPLE 6

*Preparation of tetracycline hexahydrate*

Tetracycline-N-ethylformamide complex (50 gm.) prepared in Example 5 was added to water (500 ml.), and slurried for 1 hour. The crystals were removed by filtration, washed with water (150 ml.), and air-dried at 37° C. for 24 hours. Tetracycline hexahydrate weighing 48 gm. was recovered and found to contain 20.2% water (Karl Fischer) and bio-assay 980 mcg./mg. tetracycline.

EXAMPLE 7

*Preparation of tetracycline hexahydrate*

Crude tetracycline base hydrate (750 gm.) having a bio-assay of 980 mcg./mg. was slowly added in 250 gm. increments with rapid stirring to formamide (3 liters). The viscose slurry was stirred for 2 hours. The crystals were removed by filtration, and washed with isopropanol (750 ml.). The damp crystals were added with rapid stirring to water (2.5 liters), and stirred for 2 hours. The crystals were removed by filtration, washed with water (1 liter) and isopropanol (500 ml.), and air-dried at 37° C. for 24 hours. The product, tetracycline hexahydrate was found to weigh 660 gm., to be absent of formamide as shown by infrared analysis and gas chromatography, and to have the following properties:

| Property [1] | |
|---|---|
| Bio-assay, mcg./mg. | 1020 (1220) |
| Chemical assay, mcg./mg. | (1075) |
| Percent water (Karl Fischer) | 19.6 |
| Percent nitrogen | (6.16) |
| Melting point (capillary, uncorrected) | 165° C. |
| Klett color [2] | 3 |
| $[\alpha]_D^{25}$ (0.1 N HCl) | −250° (−299°) |
| E 1% (0.1 N HCl) | 215$\gamma$=264 (315) |
| | 267$\gamma$=340 (404) |
| | 215$\gamma$=259 (309) |

[1] The values on an anhydrous basis are placed in parentheses.
[2] Ten mg./ml. of tetracycline hexahydrate in formamide, reading on a Klett-Summerson photoelectric colorimeter equipped with a #54 green filter.

EXAMPLE 8

*Preparation of tetracycline hexahydrate*

A 100-gram portion of tetracycline base trihydrate was added to dimethylformamide (400 ml.). The mixture was stirred for 2 hours. The crystals were removed by filtration, washed with isopropanol (200 ml.), and air-dried at 37° C. for 24 hours. The product, tetracycline hexahydrate, was found to weigh 94 gm., to be absent of dimethylformamide as shown by infrared analysis and gas chromatography, and to have the following properties:

Property [1]

| | |
|---|---|
| Bio-assay, mcg./mg. | 930 (1145) |
| Chemical assay, mcg./mg. | (1080) |
| Percent water (Karl Fischer) | 19 |
| Percent nitrogen | 5.13 (6.3) |
| Melting point (capillary, uncorrected) | 164° C. |
| Klett color [2] | 3 |
| $[\alpha]_D^{25}$ (0.1 N HCl) | −257° (−317°) |
| E 1% (0.1 N HCl) | 217γ=240 (296) |
| | 270γ=322 (400) |
| | 355γ=251 (310) |

[1] The values on an anhydrous basis are placed in parentheses.
[2] Ten mg./ml. of tetracycline hexahydrate in formamide, reading on a Klett-Summerson photoelectric colorimeter equipped with a #54 green filter.

EXAMPLE 9

*Purification of tetracycline*

Twenty-five grams of a mixture containing 75% tetracycline base trihydrate, 5% chlortetracycline base hydrate, 10% ammonium quatrimycin (4-epitetracycline), and 10% by weight anhydrotetracycline base were dissolved in formamide (150 ml.) and allowed to crystallize for 2 hours. The resultant crystals of tetracycline-formamide complex were separated by filtration, and washed with formamide (30 ml.) and isopropanol (100 ml.). The solvent damp crystals were added to water (300 ml.) and mixed for 1 hour. The crystals that formed were separated by filtration, washed with water (100 ml.), and air-dried at 37° C. for 24 hours. Fifteen grams of tetracycline hexahydrate were recovered.

The purity of the tetracycline hexahydrate was determined by circular paper-strip chromatography according to the procedure of Kaplan, M. A. and Buckwalter, F. H., Anhydroquatrimycin, an Epimer of Anhydrotetracycline: Antibiotics Annual 1957–1958, Medical Encyclopedia, Inc., New York, New York. The paper-strip chromatography showed substantially only a tetracycline zone. Significant amounts of chlortetracycline, anhydrotetracycline, and quatrimycin zones were not visible under ultraviolet light.

EXAMPLE 10

*Color and potency stability comparison*

A comparison was made of the color and potency stability of tetracycline base hexahydrates purified via the formation of tetracyclineformamide and dimethylformamide complexes from crude tetracycline with tetracycline base trihydrate purified by twice recrystallizing crude tetracycline from acetone and water solutions containing sodium bisulfate.

Water suspensions of the three purified tetracycline products were prepared containing 25 mg./ml. of tetracycline, and 0.1% w./v. of sodium metabisulfite. The suspensions were passed through a 200 mesh stainless steel screen, adjusted to pH 4.2 with phosphoric acid and filled into flint glass bottles without deaeration or nitrogen flushing.

The actual color values of the suspensions were measured weekly at 56° C. These were obtained by dissolving 0.5 ml. of the tetracycline-water suspension in 9.5 ml. of formamide and reading on a Klett-Summerson photoelectric colorimeter equipped with a #54 green filter. The percentage decrease in potency was calculated from weekly bio-assays.

The data indicate that tetracycline-water suspensions containing tetracycline prepared by the process of this invention have improved color and potency stability, and are presented in the following table:

TABLE.—COLOR AND POTENCY STABILITY OF TETRACYCLINE-WATER SUSPENSIONS STORED AT 56° C.

| | Original Color | Klett Color | | | | Percent Decrease in Potency | | | |
|---|---|---|---|---|---|---|---|---|---|
| | | Weeks Stored | | | | Weeks Stored | | | |
| | | 1 | 2 | 3 | 4 | 1 | 2 | 3 | 4 |
| Twice Recrystallized | 0 | 3 | 29 | 244 | | 17 | 32 | 59 | |
| Formamide-purified | 0 | 0 | 20 | 24 | 123 | 7 | 12 | 16 | 30 |
| Dimethylformamide-purified | 0 | 0 | 20 | 42 | 70 | 7 | 12 | 21 | 49 |

Thus, it is readily apparent from the foregoing that a new process for producing tetracycline has been invented. The novel tetracycline product, tetracycline hexahydrate, produced by the process is both pure and color and potency stable to light and heat. In addition, novel tetracycline-amide complexes useful for preparing tetracycline hexahydrate and a process for their preparation have also been invented.

While this invention has been described and exemplified in terms of its preferred embodiment, those skilled in the art will appreciate that modifications can be made without departing from the spirit and scope of this invention.

I claim:

1. A complex of tetracycline and an amide selected from the group consisting of formamide, methylformamide, ethylformamide and dimethylformamide.
2. The tetracycline-formamide complex.
3. The tetracycline-methylformamide complex.
4. The tetracycline-ethylformamide complex.
5. The tetracycline-dimethylformamide complex.
6. The process which comprises contacting tetracycline with an amide selected from the group consisting of formamide, methylformamide, ethylformamide and dimethylformamide in the proportion of about 200 to 500 milligrams tetracycline per milliliter of amide to form a tetracycline-amide complex; and recovering said complex.

7. The process of claim 6 wherein said amide is formamide.

8. The process of claim 6 wherein said amide is methylformamide.

9. The process of claim 6 wherein said amide is ethylformamide.

10. The process of claim 6 wherein said amide is dimethylformamide.

11. The process which comprises contacting tetracycline with an amide selected from the group consisting of formamide, methylformamide, ethylformamide and dimethylformamide in the proportion of about 200 to 500 milligrams tetracycline per milliliter of amide to form tetracycline-amide complex; separating said complex; and slurrying said complex with water to form tetracycline hexahydrate.

12. The method of claim 11 wherein said amide is formamide.

13. The method of claim 11 wherein said amide is methylformamide.

14. The method of claim 11 wherein said amide is ethylformamide.

15. The method of claim 11 wherein said amide is dimethylformamide.

16. The process which comprises contacting tetracycline with an amide selected from the group consisting of formamide, methylformamide, ethylformamide and dimethylformamide in the proportion of about 200 to 500 milligrams tetracycline per milliliter of amide to form a tetracycline-amide complex; separating said complex; slurrying said complex with water to form tetracycline hexahydrate; and recovering said tetracycline hexahydrate.

17. The method of claim 16 wherein said amide is formamide.

18. The method of claim 16 wherein said amide is dimethylformamide.

19. The process which comprises contacting tetracycline with an aqueous amide selected from the group consisting of formamide, methylformamide, ethylformamide and dimethylformamide in the proportion of about 200 to 500 milligrams tetracycline per milliliter of amide to form a tetracycline-amide complex; separating said complex; slurrying said complex with water to form tetracycline hexahydrate; and recovering said tetracycline hexahydrate.

References Cited by the Examiner

UNITED STATES PATENTS

| 3,005,023 | 10/1961 | Miller | 260—559 |
| 3,036,120 | 5/1962 | Hammer et al. | 260—559 |
| 3,062,717 | 11/1962 | Hammer | 260—559 |

FOREIGN PATENTS

| 17,044 | 9/1963 | Japan. |
| 17,045 | 9/1963 | Japan. |

OTHER REFERENCES

Chemical Abstracts (I), vol. 60, pp. 1195–96, January 1964 (Abstract of Bulletin of the Chemical Society of Japan, vol. 36, pp. 1163–68, September 1963).

Chemical Abstracts (II), vol. 60, pp. 2874–75, February 1964 (Abstract of Japanese Patent 17,044 cited above).

NICHOLAS S. RIZZO, *Primary Examiner.*

ALEX MAZEL, *Examiner.*

J. W. ADAMS, *Assistant Examiner.*